United States Patent [19]

Pai

[11] Patent Number: 4,997,151
[45] Date of Patent: Mar. 5, 1991

[54] FOLDABLE SUPPORT FOR A TABLE

[76] Inventor: White Pai, No. 23, Lane 42, Ta Feng Rd., Shern Kang Hsiang, Taichung Hsien, Taiwan

[21] Appl. No.: 522,578

[22] Filed: May 14, 1990

[51] Int. Cl.⁵ .................. F16M 11/00; A47B 3/00
[52] U.S. Cl. ..................... 248/167; 108/113; 108/115; 108/157; 248/188.6; 248/166
[58] Field of Search .......... 248/167, 188.6, 166; 108/113, 115, 157, 150

[56] References Cited

U.S. PATENT DOCUMENTS

| | | | |
|---|---|---|---|
| 3,080,193 | 3/1963 | Nimmo | 108/115 X |
| 3,174,796 | 3/1965 | Brown | 108/113 X |
| 3,309,055 | 3/1967 | Sefcik | 108/157 X |
| 4,315,467 | 2/1982 | Vanderminden | 108/157 |
| 4,905,612 | 3/1990 | Assembly | 248/167 X |

*Primary Examiner*—Carl D. Friedman
*Assistant Examiner*—Rhonda H. Banks
*Attorney, Agent, or Firm*—Bacon & Thomas

[57] ABSTRACT

A foldable support for a table includes three or more pairs of leg members coupled together by three or more frame plates. One end of each pair of leg members is coupled by a bending member. A sleeve which is fixed to each end of the frame plates is provided between the bending member and the leg member. The sleeve is rotatable relative to the tube so that the frame plates are foldable relative to the leg members.

4 Claims, 6 Drawing Sheets

FOLDABLE SUPPORT FOR A TABLE

BACKGROUND OF THE INVENTION

The present invention relates to a support for a table, and more particularly to a foldable support for a table.

Various types of tables are used today. Most of the tables are fixed and are not foldable. Some of the tables are foldable, but the table surface is generally fixed to two feet thereof which is not good for transportation and is not portable.

The present invention has arisen to mitigate and/or obviate the afore-described disadvantages of the conventional table.

SUMMARY OF THE INVENTION

The primary objective of the present invention is to provide a foldable support for a table, in which the foldable support can be dismembered or can be folded so that the foldable support is portable.

Another objective of the present invention is to provide a foldable support for a table, in which the configuration of the foldable support is adjustable corresponding to the table surface of different shape.

In accordance with one aspect of the invention, there is provided a foldable support for a table which includes three or more pairs of leg members coupled together by three or more frame plates. A sleeve is fixed to each end of the frame plates. One end of each pair of leg members is coupled by a bending member. Each leg member includes a tube. The sleeve is provided between one end of the bending member and one end of the tube. The bending member and the tube are coupled together by a rod. The sleeve is rotatable relative to the tube so that the frame plates are foldable relative to the leg members.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
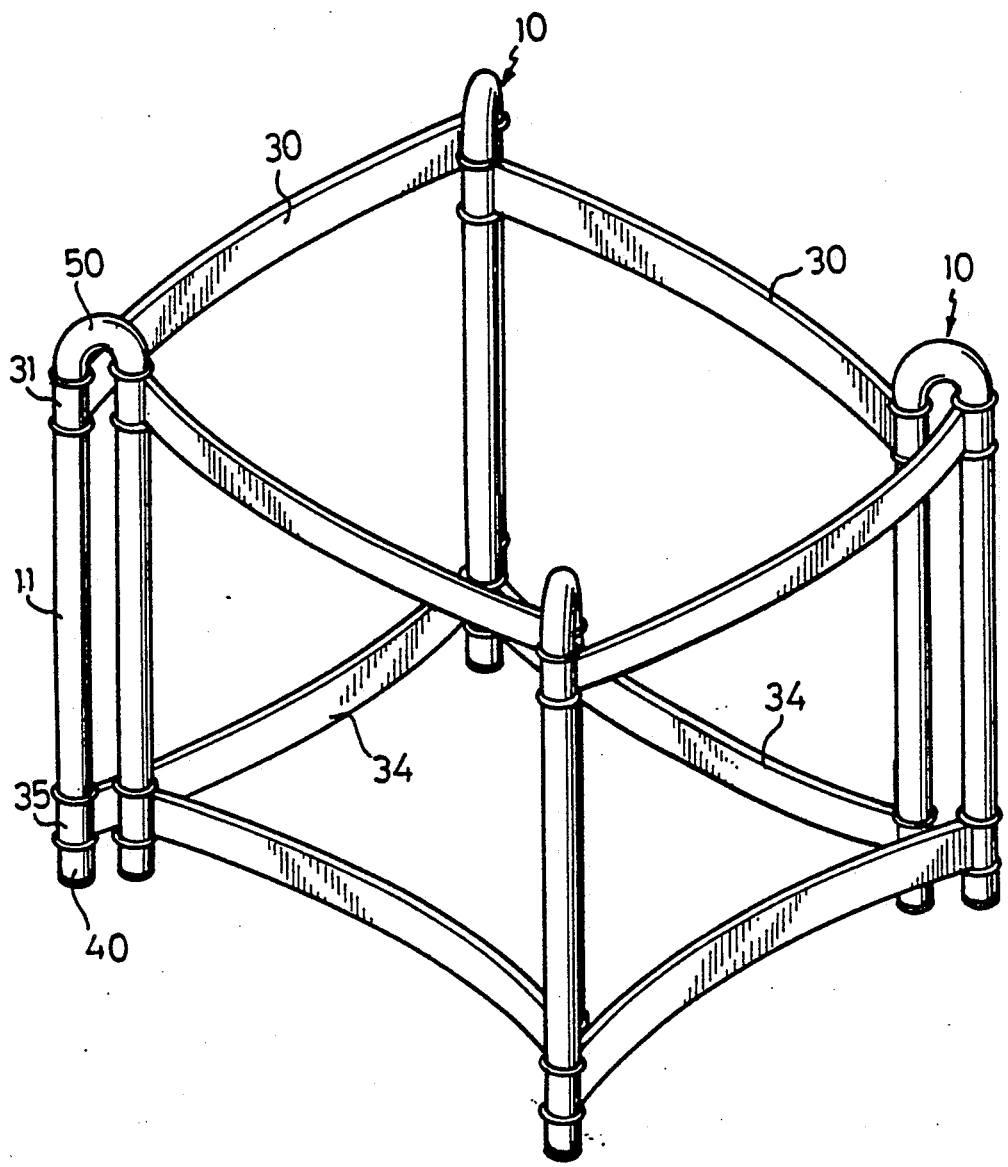
FIG. 1 is a perspective view of a foldable support for a table in accordance with the present invention.
Figure 2:
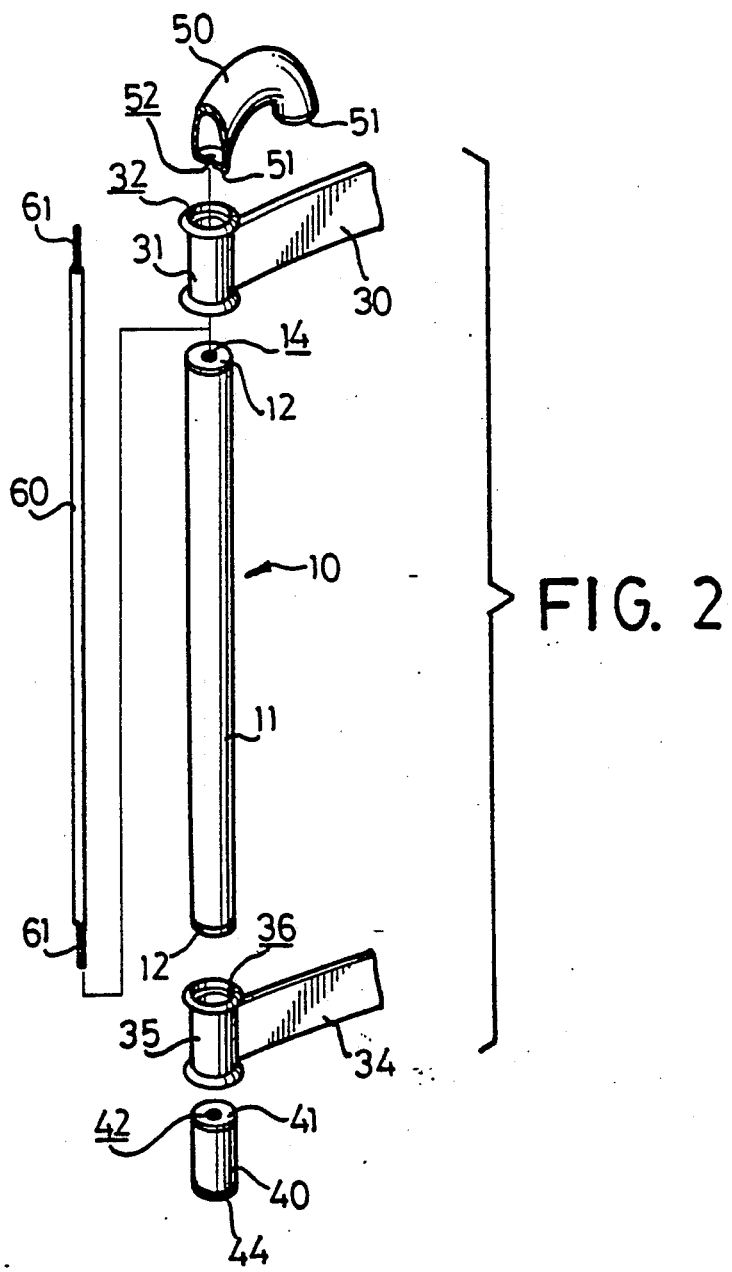
FIG. 2 is an exploded view of a leg element.
Figure 3:
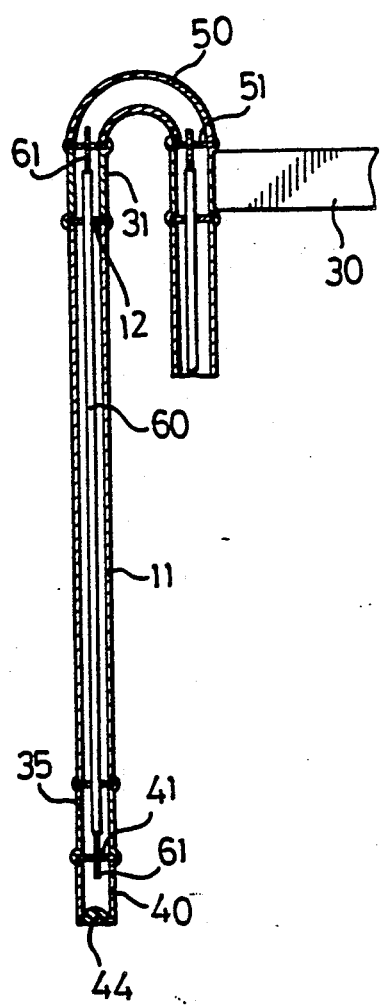
FIG. 3 is a cross sectional view of the leg element which is assembled.

Referring to the drawings and initially to FIGS. 1, 2 and 3, the foldable support for a table in accordance with the present invention comprises generally four pairs of leg elements 10 coupled by four pairs of frame plates 30, 34. The upper frame plates 30 and the lower frame plates 34 which are slightly curved are substantially identical in shape but are disposed in reverse, in which the upper frame plates 30 are convex and the lower frame plates 34 are concave.

Each leg element 10 includes a cylindrical tube 11, each end of which is enclosed by a disc 12 which has a center hole 14. A rod 60 which has a threaded portion 61 formed on each end thereof extends through the holes 14 of the tube 11. A sleeve 31, 35 is vertically fixed to each end of the frame plates 30, 34. A shoulder or an annular recess 32, 36 is formed in each end of the sleeve 31, 35. Both ends of the tube 11 are received in the respective shoulders 32, 36 of the sleeves 31, 35. A disc 41 which has a threaded hole 42 is disposed on an upper end and a pad 44 or the like is disposed on a lower end of each base member 40. The upper end of the base member 40 is received in the shoulder 36 of the sleeve 35, and the threaded portion 61 is threadedly engaged with the threaded hole 42 of the disc 41.

A bending member 50 which is substantially semicircular has a disc 51 disposed on each end thereof. Each disc 51 has a threaded hole 52 formed in a center thereof. Each end of the bending member 50 is received in the shoulder 32 of the sleeve 31, and the upper threaded portion 61 of the rod 60 is threadedly engaged with the threaded hole 52 of the disc 51. The bending member 50 couples the upper ends of each pair of leg members 10. It is to be noted that the sleeves 31, 35 are rotatable relative to the tubes 11 so that the frame plates 30, 34 are rotatable.

Figure 4:
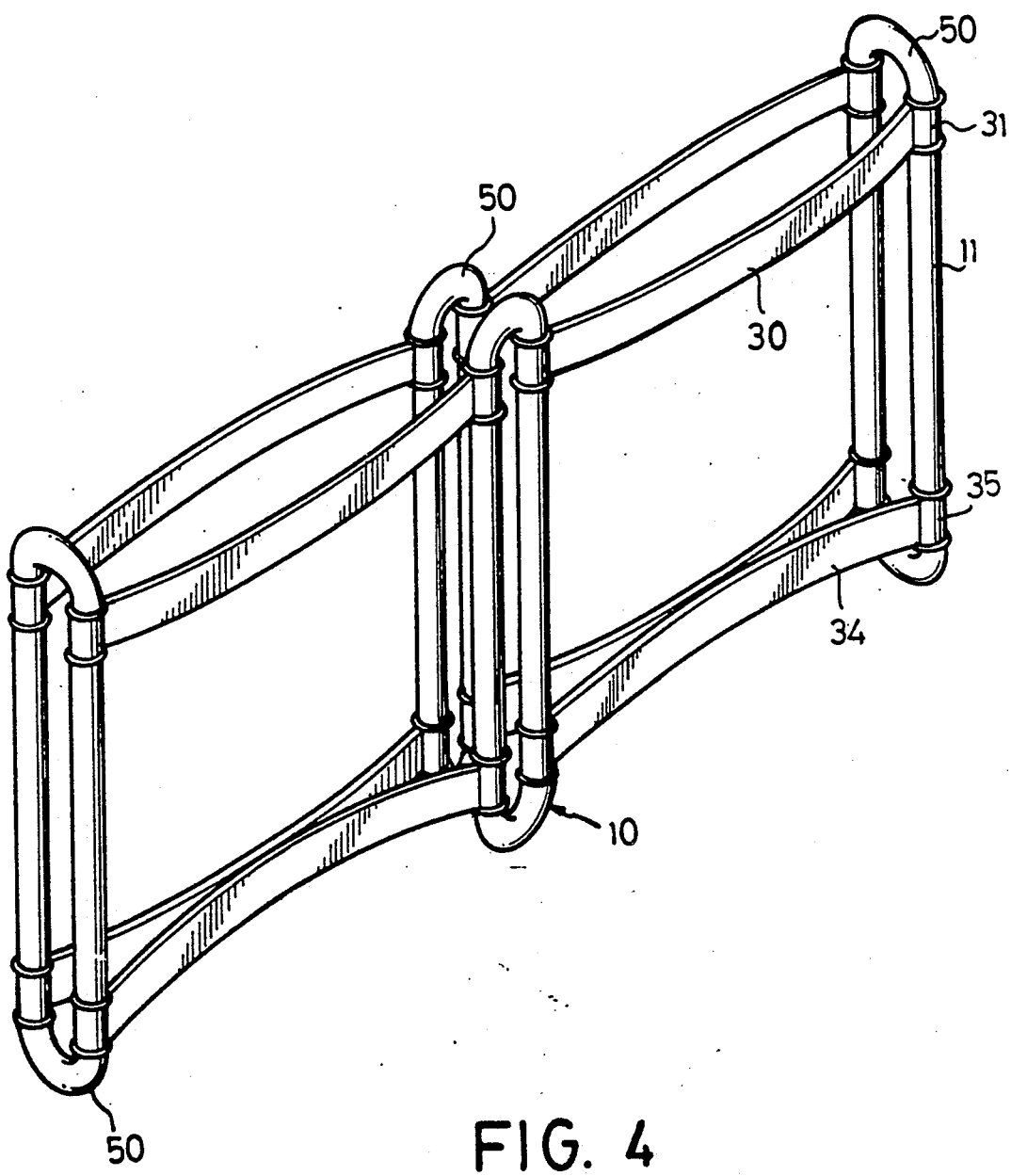
FIG. 4 is a perspective view of the foldable support which is folded.
Figure 5:
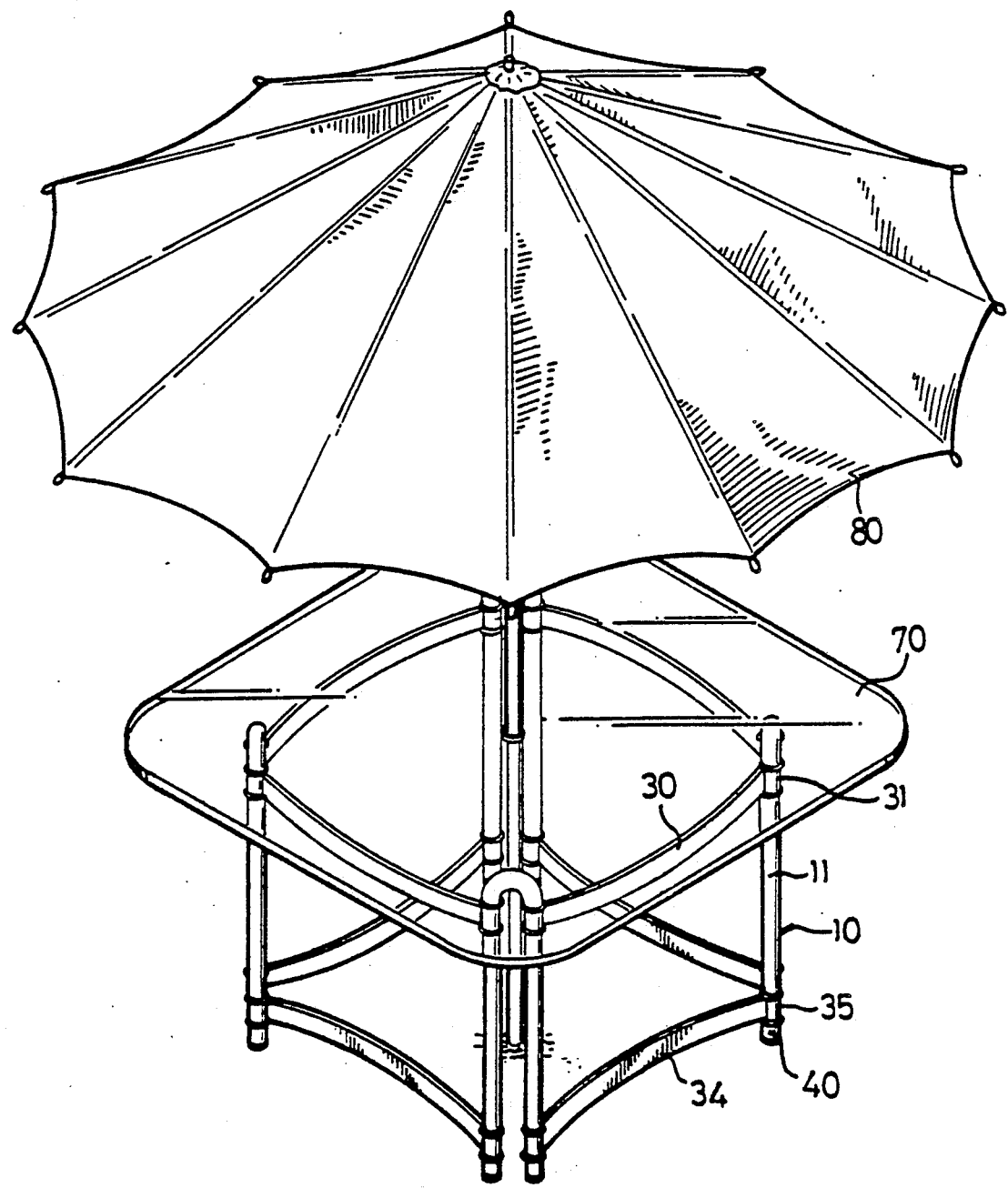
FIG. 5 is a perspective view of the foldable support on which a table surface and a beach umbrella are provided.
Figure 6:
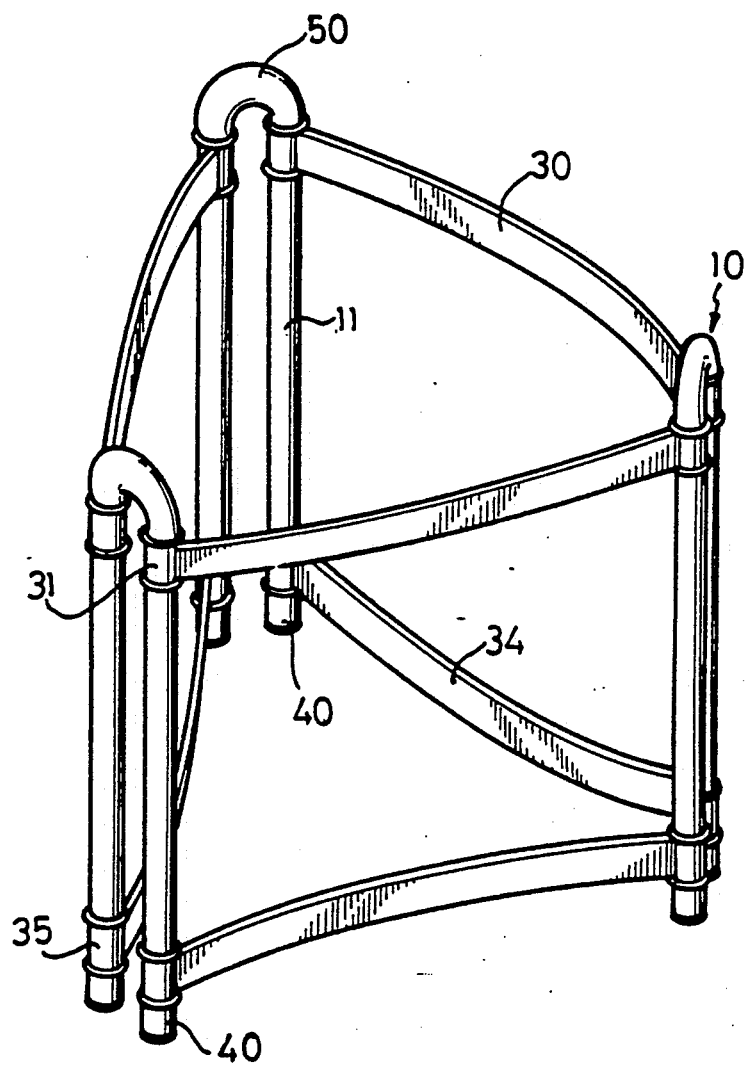
FIG. 6 is a perspective view of the foldable support in which three pairs of leg members are used.

Referring next to FIG. 4, the foldable support can be assembled and folded to a shape similar to a plane. As shown in this figure, the lower ends of each pair of leg members 10 are coupled together by a bending member 50. The foldable support can be dismembered for transportation purposes. As shown in FIG. 5, a table surface 70 is provided upon the foldable support and a beach umbrella 80 is provided on a middle of the table surface 70. The whole structure can be dismembered and is portable. It is to be noted that the foldable support in accordance with the present invention can be formed by different pairs of leg members 10 according to a table surface of different shape, in which at least three pairs of leg members 10 are required to form the foldable support. As shown in FIG. 6, three pairs of leg members 10 are used.

Accordingly, the foldable support in accordance with the present invention can be dismembered for transportation purposes, and can be configured to different shape according to the shape of the table surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A foldable support for a table comprising at least three pairs of leg members coupled together by at least three frame plates; a sleeve being fixed to each end of said frame plates; at least one end of each pair of leg members being coupled by a bending member; each said leg member including a tube, said sleeve being provided between one end of said bending member and one end of said tube, said one end of said bending member and said one end of said tube being coupled together; said sleeve being rotatable relative to said tube so that said frame plates are foldable relative to said leg members.

2. A foldable support according to claim 1, wherein a shoulder is formed in each end of said sleeve, said one end of said bending member and said one end of said tube are received in said shoulder.

3. A foldable support according to claim 1, wherein two frame plates which have a sleeve fixed to each end thereof are coupled between every two adjacent pairs of leg members; an upper end of said tube is received in a lower shoulder of said sleeve of an upper frame plate, a lower end of said bending member is received in an upper shoulder of said sleeve of said upper frame plate; a lower end of said tube is received in an upper shoulder of said sleeve of a lower frame plate, an upper end of a base member is received in a lower shoulder of said sleeve of said lower frame plate; said lower end of said bending member and said upper end of said base member are coupled together by a rod; and said frame plates are rotatable relative to said tubes.

4. A foldable support according to claim 1, wherein two frame plates which have a sleeve fixed to each end thereof are coupled between every two adjacent pairs of leg members, both ends of each pair of leg members are coupled together by a bending members; an upper end of said tube is received in a lower shoulder of said sleeve of an upper frame plate, a lower end of said bending member is received in an upper shoulder of said sleeve of said upper frame; plate; a lower end of said tube is received in an upper shoulder of said sleeve of a lower frame plate, an upper end of a lower bending member is received in a lower shoulder of said sleeve of said lower frame plate; said lower end of said upper bending member and said upper end of said lower bending member are coupled together by a rod; and said frame plates are rotatable relative to said tubes.

* * * * *